US010785265B2

(12) United States Patent
Huang et al.

(10) Patent No.: US 10,785,265 B2
(45) Date of Patent: Sep. 22, 2020

(54) METHOD FOR TARGET SEQUENCE IDENTIFICATION AND DEVICE THEREOF

(71) Applicant: Beijing University of Posts and Telecommunications, Beijing (CN)

(72) Inventors: Shanguo Huang, Beijing (CN); Xin Li, Beijing (CN); Junfeng Guo, Beijing (CN); Ying Tang, Beijing (CN); Yongjun Zhang, Beijing (CN); Shan Yin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 16/451,274

(22) Filed: Jun. 25, 2019

(65) Prior Publication Data

US 2020/0236142 A1 Jul. 23, 2020

Related U.S. Application Data

(63) Continuation of application No. PCT/CN2019/088240, filed on May 24, 2019.

(30) Foreign Application Priority Data

Jan. 23, 2019 (CN) .......................... 2019 1 0063873

(51) Int. Cl.
*H04L 29/06* (2006.01)
*H04B 10/25* (2013.01)
*H04Q 11/00* (2006.01)

(52) U.S. Cl.
CPC ............. *H04L 63/20* (2013.01); *H04B 10/25* (2013.01); *H04L 63/02* (2013.01); *H04L 63/14* (2013.01); *H04L 63/1408* (2013.01); *H04Q 11/0005* (2013.01); *H04Q 2011/0013* (2013.01); *H04Q 2011/0015* (2013.01)

(58) Field of Classification Search
CPC ......... H04L 63/00; H04L 63/02; H04L 63/14; H04L 63/1408; H04L 63/1416; H04L 63/1425; H04L 63/1433; H04L 63/1441; H04L 63/1466; H04L 63/1475
See application file for complete search history.

(56) References Cited

U.S. PATENT DOCUMENTS

2005/0219066 A1\* 10/2005 Bhardwaj ................. G06E 1/02
341/13

\* cited by examiner

*Primary Examiner* — Edward Zee
(74) *Attorney, Agent, or Firm* — Westbridge IP LLC

(57) ABSTRACT

Disclosed is a method and device for target sequence identification, wherein an optical binary sequence and an all-zero sequence are subjected to an XNOR operation and a first candidate sequence set is generated by splitting the result sequence; a second candidate sequence set is generated by splitting the optical binary sequence; multiple binary sequences are selected from the first candidate sequence set and the second candidate sequence set according to the target sequence to generate a to-be-delayed sequence set; various delay duration are configured for each binary sequence of the to-be-delayed sequence set; a to-be-matched sequence set is generated after delaying; an AND operation is performed on the sequences of the to-be-matched sequence set to generate a final sequence; and the number and position of the target sequence in the binary sequence can be determined according to the number and position of a pulse in the final sequence.

20 Claims, 14 Drawing Sheets

METHOD FOR TARGET SEQUENCE IDENTIFICATION AND DEVICE THEREOF

CROSS-REFERENCE TO RELATED APPLICATIONS

The present application is a continuation of PCT application PCT/CN2019/088240 entitled "Method for Target Sequence Identification and Device thereof" filed on May 24, 2019, which claims priority of Chinese patent application CN201910063873. X, filed on Jan. 23, 2019, the entire contents of which are incorporated herein by reference.

TECHNICAL FIELD

The present disclosure relates to optical network security technology, in particular to a method for target sequence identification and a device thereof.

BACKGROUND

With the advent of information age, people's demand for network bandwidth and transmission rate will further increase under the influence of video conference, telemedicine, cloud computing, virtual reality and other new applications. Fiber-optic communications have been widely used in modern telecommunication networks because of its advantages of large communication capacity, long transmission distance and small signal interference. Fiber-optic communications also have the characteristics of good confidentiality, anti-electromagnetic interference and closed transmission medium. It is generally considered as highly secure. However, with the development of technology, a variety of network intrusion methods have emerged. Through the use of interference, eavesdropping and other means of damage, eavesdropping information transmitted in an optical network has become possible. In this situation, the security problem of the optical network has become increasingly prominent. At the same time, due to the transmission characteristics of the optical network, such as, broadband and large-capacity, even a very brief attack on the optical network will lead to a large amount of data leakage or errors. It may even cause paralysis of the entire optical network.

As a mature and effective security measure against network attacks and intrusions, electronic firewalls can filter signals according to various attributes. However, using electronic firewalls in optical networks requires multiple optical/electrical and electrical/optical conversions, which is not only complex but also with high energy consumption. These optical/electrical and electrical/optical conversions may bring a large time delay, and therefore increase the cost, volume and complexity of the system. Processing speed of the system is also limited by these optical/electrical and electrical/optical conversions. Photon firewalls, as a technical reserve to protect optical networks directly in the optical domain, can be used for ultra-high-speed optical signals detections and identifications. Photon firewalls can also be used to process attack signals. All-optical signal processing technology which can process signals in the optical domain, can not only avoid complex optical/electrical and electrical/optical conversions, but also reduce the time delay caused by processing high-speed optical signals. Therefore, all-optical signal processing technology can be adopted to construct photon firewalls in the optical domain to realize direct optical signal intrusion detection and security protection in optical domain. In that way, conversions of optical/electrical/optical can be avoided, the energy loss can be saved, and the ultra-high-speed optical signals can be processed.

SUMMARY

Some embodiments of the present disclosure provide a method for target sequence identification. The method includes:

performing an XNOR operation on an optical binary sequence and an all-zero sequence;

generating a first candidate sequence set by splitting the result sequence of the XNOR operation into multiple binary sequences; wherein, the number U of binary sequences in the first candidate sequence set is not less than the length N of the target sequence;

generating a second candidate sequence set by splitting the optical binary sequence into multiple binary sequences; wherein, the number of binary sequences in the second candidate sequence set is the same as the number of binary sequences in the first candidate sequence set;

selecting U binary sequences from the first candidate sequence set and the second candidate sequence set according to the target sequence to generate a to-be-delayed sequence set;

configuring various delay durations for each binary sequence of the to-be-delayed sequence set in a descending manner;

generating a to-be-matched sequence set by delaying each binary sequence of the to-be-delayed sequence set according to its delay duration configured;

performing an AND operation on the binary sequences in the to-be-matched sequence set to generate a final sequence; and determining the number and position of the target sequence in the optical binary sequence according to the number and position of a pulse in the final sequence.

Some embodiments of the present disclosure also provide a device for target sequence identification. The device includes:

a first candidate sequence set generation module, to perform an XNOR operation on an optical binary sequence and an all-zero sequence, generate a first candidate sequence set by splitting the result sequence of the XNOR operation into multiple binary sequences; wherein, the number U of binary sequences in the first candidate sequence set is not less than the length N of the target sequence;

a second candidate sequence set generation module, to generate a second candidate sequence set by splitting the optical binary sequence into multiple binary sequences; wherein, the number of binary sequences in the second candidate sequence set is the same as the number of binary sequences in the first candidate sequence set;

a preprocessing module, to select P binary sequences from the first candidate sequence set and the second candidate sequence set according to the target sequence to generate a to-be-delayed sequence set;

a delay module, to configure various delay durations for each binary sequence of the to-be-delayed sequence set in a descending manner, generate a to-be-matched sequence set by delaying each binary sequence of the to-be-delayed sequence set according to its delay duration configured;

an AND logic module, to perform an AND operation on the binary sequences in the to-be-matched sequence set to generate a final sequence; and an identification module, to determine the number and position of the target sequence in the optical binary sequence according to the number and position of a pulse in the final sequence.

As can be seen from the above description, in the method and device for target sequence identification provided by the embodiments of the present disclosure two candidate sequence sets can be generated by one XNOR operation and optical splitting operations without repeatedly performing XNOR operations, thereby the matching time of binary sequences can be greatly reduced and the efficiency of target sequence identification is greatly improved. In addition, in the method and device for target sequence identification provided by the embodiments of the present disclosure, the final sequence can be generated by adopting an AND operation on the binary sequences in the to-be-matched sequence set, without performing AND operations repeatedly and circularly, so that no interference pulse may be generated, and the output result may be clearer and more accurate.

BRIEF DESCRIPTION OF DRAWINGS

In order to illustrate the embodiments of the present disclosure more clearly, reference will now be made to the accompanying drawings, which are incorporated in and constitute a part of this specification, and in which.

DETAILED DESCRIPTION OF THE EMBODIMENTS

To further clarify the present disclosure, description of the embodiments will be made by reference to the appended drawings.

It should be noted that the expressions "first" and "second" are used throughout the embodiments of the present disclosure to distinguish between two different entities or different quantities with the same name. And the expressions "first" and "second" are used merely for convenience of description and are not to be construed as limiting the embodiments of the present disclosure.

As previously mentioned, the photon firewalls can use all-optical signal processing technology to carry out intrusion detection and security protection on optical signals directly in the optical domain. In that way, not only optical/electrical/optical conversions can be avoided, energy consumption can be saved, but also ultra-high-speed optical signals can be processed. The key technology of the photon firewalls is all-optical binary sequence identification. All-optical binary sequence identification refers to the identification of a target sequence in an optical binary sequence, which can be used in many occasions, such as identifying a source address, a source port, and etc. in a packet header in optical packets switching, judging whether a packet is from a malicious attacker. All-optical binary sequence identification can be implemented using all-optical logic gates and correlators.

Figure 1:
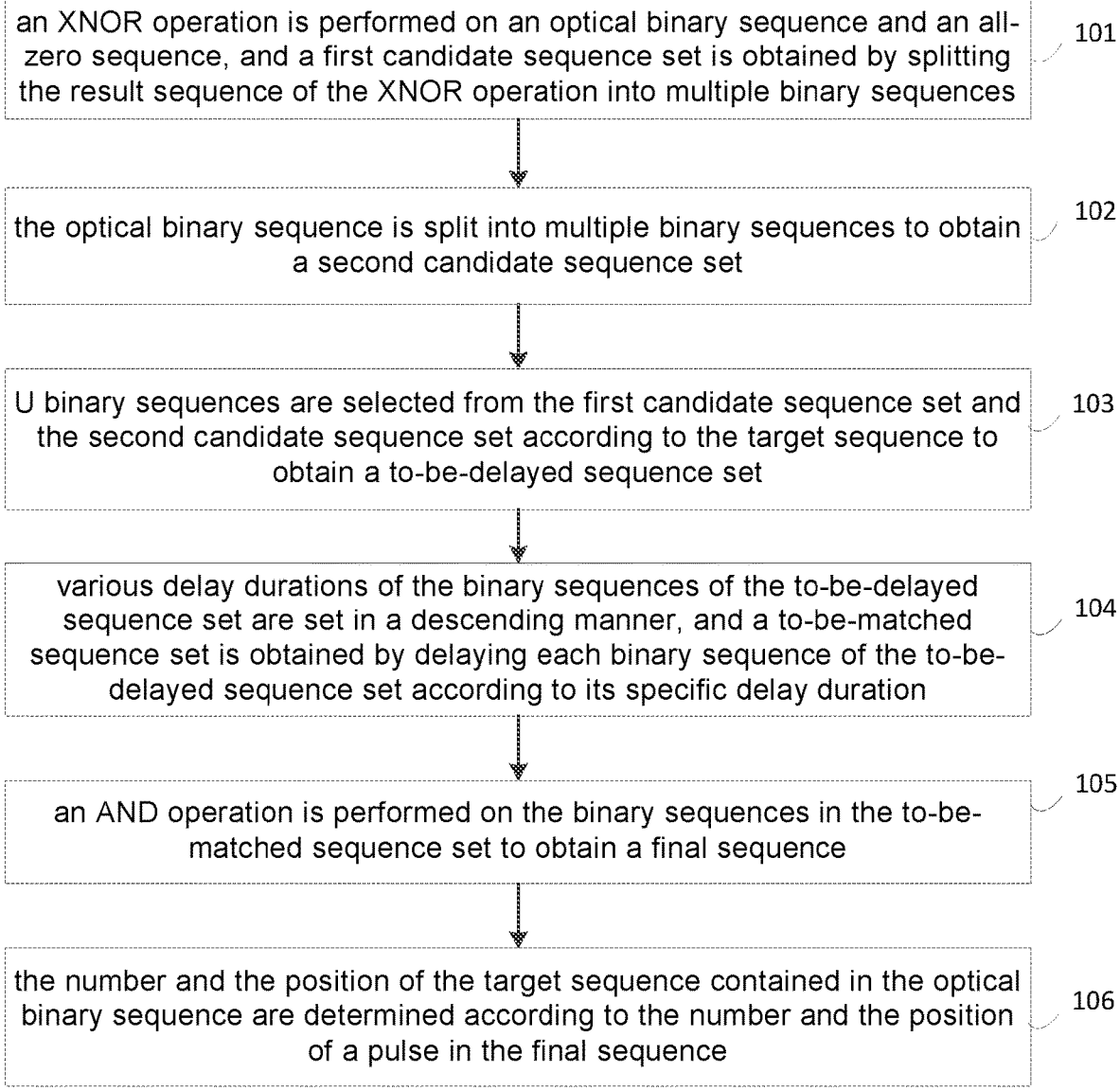
FIG. 1 is a flowchart of a target sequence identification method according to some embodiments of the present disclosure.

FIG. 1 is a flowchart of a method for target sequence identification according to an embodiment of the present disclosure. As shown in FIG. 1, the target sequence identification method according to an embodiment of the present disclosure may include the following procedures.

In block 101, an exclusive NOR (XNOR) operation is performed on an optical binary sequence and an all-zero sequence, and then a first candidate sequence set is generated by splitting the result sequence of the XNOR operation into multiple binary sequences.

In some embodiments, the number U of binary sequences in the first candidate sequence set can be set as no less than the length N of the target sequence.

If the maximum length of the target sequence that can be identified by the system is set to P in advance, and the minimum length of a target sequence that can be identified by the system is set to L, the number U of binary sequences in the above-mentioned first candidate sequence set may be set to P.

Figure 2:
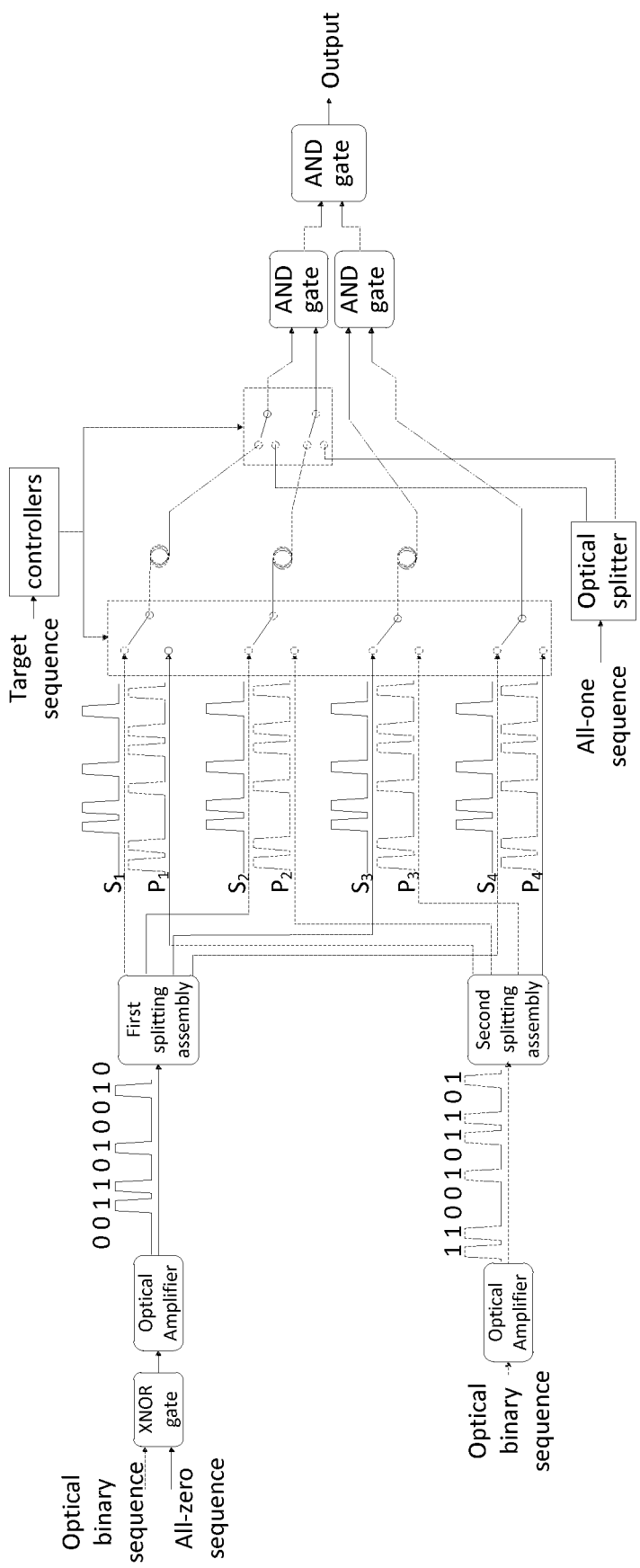
FIG. 2 is a diagram illustrating the process for generating candidate sequence sets according to some embodiments of the present disclosure.

In the following, the process of generating the above-mentioned first candidate sequence set is described in detail by way of example with reference to FIG. 2. As shown in FIG. 2, the above-mentioned procedures in block 101 can be realized by an XNOR gate and a first optical splitting assembly. In practice, the means for realizing the above-mentioned procedures in block 101 may further include an optical amplifier.

In FIG. 2, it is assumed that the number U of the binary sequences in the above-mentioned first candidate sequence set is 4. It is also assumed that the optical binary sequence is A={1,1,0,0,1,0,1,1,0,1}, the target sequence is B={0,1,1,0}, and the length of the target sequence N equals to 4.

In some embodiments, the operation procedure on the binary sequence A in the above block 101 mainly includes the following steps:

First, an initial sequence S={0,0,1,1,0,1,0,0,1,0} can be generated by inputting the binary sequence A={1,1,0,0,1,0,1,1,0,1} as described above and an all-zero sequence {0,0,0,0,0,0,0,0,0,0} into an XNOR gate. The initial sequence S indicates positions in the binary sequence of the "0"s of the target sequence.

After the initial sequence S is generated, the initial sequence S would then be split by the first optical splitting assembly into four sequences by a first splitting assembly, which constitute the first candidate sequence set $S^U=\{S_1, S_2, S_3, S_4\}$, wherein, $S_1=S_2=S_3=S_4=\{0,0,1,1,0,1,0,0,1,0\}$. And in some embodiments, the first optical splitting assembly can be realized by at least one optical splitter.

In some embodiments, before the initial sequence S is split, the initial sequence S can be input into an optical amplifier for power amplification. In this case, the power of each binary sequence after being split can be prevented from being too low. By the power amplification, only the power of the initial sequence S can be amplified by several times, but the sequence S itself would not be changed. And then the amplified initial sequence S would be split into four sequences by the first optical splitting assembly to form the first candidate sequence set $S^U=\{S_1, S_2, S_3, S_4\}$, wherein, $S_1=S_2=S_3=S_4=\{0,0,1,1,0,1,0,0,1,0\}$.

In block 102, the optical binary sequence is split into multiple binary sequences to generate a second candidate sequence set.

In some embodiments, the number of binary sequences in the second candidate sequence set may be the same as the number of binary sequences in the first candidate sequence set.

The process of generating the second candidate sequence set is described in more detail below, by way of example, with reference to FIG. 2. As shown in FIG. 2, the above-mentioned procedures of block 102 may be implemented by a second optical splitting assembly. In practice, the components implementing the above-mentioned procedure in block 102 may further include an optical amplifier.

As shown in FIG. 2, the optical binary sequence A={1,1,0,0,1,0,1,1,0,1} is input directly into the system, where the optical binary sequence A may indicate the location of '1's in the optical binary sequence itself. In the procedure above, the optical binary sequence may be split by a second optical splitting assembly, resulting in a second candidate sequence set of four sequences $A^U=\{A^1, A_2, A_3, A_4\}$, wherein, $A_1=A_2=A_3=A_4=\{1,1,0,0,1,0,1,1,0,1\}$. In some embodiments, the second optical splitting assembly may be implemented by at least one optical splitter.

In some embodiments, before the optical binary sequence A is split, the optical binary sequence A can be input into an optical amplifier for power amplification so as to avoid the power of each sequence being too low after being split. By power amplification, the power of the optical binary sequence A can be amplified by several times, but the optical binary sequence A itself does not change. And then the amplified binary sequence A would be split into four sequences by the second optical splitting assembly to form the second candidate sequence set $A^U\{A_1, A_2, A_3, A_4\}$, wherein, $A_1=A_2=A_3=A_4=\{1,1,0,0,1,0,1,1,0,1\}$.

In block 103, U binary sequences are selected from the first candidate sequence set and the second candidate sequence set according to the target sequence to generate a to-be-delayed sequence set.

In some embodiments, the procedure in block 103 specifically includes the following steps:

Each binary sequence in the first candidate sequence set is matched with one binary sequence in the second candidate sequence set to generate U binary sequence pairs.

In some embodiments, each of the first candidate sequence set and the second candidate sequence set includes U binary sequences. And one binary sequence in the first candidate sequence set and one binary sequence in the second candidate sequence set can be paired to generate a binary sequence pair in this step. And by repeating such operations, U binary sequence pairs can be generated.

After U binary sequence pairs are generated, a binary sequence is selected from each binary sequence pair based on the target sequence.

In some embodiments, the above selection procedure can be achieved by the following method:

First, the last N binary sequence pairs of the U binary sequence pairs are set in one-to-one correspondence with the N bits the target sequence respectively.

For the last N binary sequence pairs of the U binary sequence pairs, when the value of the corresponding bit of the target sequence is '0', the binary sequence from the first candidate sequence set in the binary sequence pair is selected as a sequence of the to-be-delayed sequence set; and when the value of the corresponding bit of the target sequence is '1', the binary sequence from the second candidate sequence set in the binary sequence pair is selected as a sequence of the to-be-delayed sequence set.

For the first U-N binary sequence pairs of the U binary sequence pairs, a binary sequence from the first candidate sequence set in the binary sequence pairs are selected as sequences of the to-be-delayed sequence set.

In some embodiments, the above selection method may be implemented by a first optical switch array and a first controller.

In some embodiments, it is assumed that U equals to P, which represents the maximum length of the target sequence that can be identified.

In some embodiments, the first optical switch array may include P two-to-one optical switches, wherein one input of each two-to-one optical switch is connected to a binary sequence of the first candidate sequence set and the other input of each two-to-one optical switch is connected to a binary sequence of the second candidate sequence set. And one binary sequence is selected from the two binary sequences to be output as one sequence of the to-be-delayed sequence set. The first controller controls the gating states of the P two-to-one optical switches in the first optical switch array according to the target sequence.

In some embodiments, the first optical switch array may be configured according to the target sequence.

When configurations are carried out, firstly, each bit of the target sequence is respectively associated with one two-to-one optical switch in the first optical switch array.

If the length of the target sequence is equal to the number of the two-to-one optical switches, each bit of the target sequence is respectively in one-to-one correspondence with one two-to-one optical switch of the first optical switch array. For example, a first bit of the target sequence corresponds to a first two-to-one optical switch in the first optical switch array; the second bit of the target sequence corresponds to a second two-to-one optical switch in the first optical switch array; . . . ; and the Nth bit of the target sequence corresponds to the Nth two-to-one optical switch in the first optical switch array.

If the length N of the target sequence is less than the number P of the two-to-one optical switches, the bits of the target sequence are respectively in one-to-one correspondence with the last N two-to-one optical switches of the first optical switch array. For example, a first bit of the target sequence corresponds to the (P-N+1)th two-to-one optical switch in the first optical switch array; the second bit of the target sequence corresponds to the (P-N+2)th two-to-one optical switch in the first optical switch array; . . . ; and the Nth bit of the target sequence corresponds to the Pth two-to-one optical switch in the first optical switch array.

And then each two-to-one optical switch may be configured respectively according to the value of its corresponding bit of the target sequence. For example, if the value of the ith bit of the target sequence is '0', the corresponding two-to-one optical switch may be configured to gate the sequence from the first candidate sequence set; and if the value of the jth bit of the target sequence is 1, the corresponding two-to-one optical switch may be configured to gate the sequence from the second candidate sequence set. If, however, a certain two-to-one optical switch does not have a corresponding relationship to any bit of the target sequence, the two-to-one optical switch may be directly configured to gate the sequence from the first candidate sequence set.

The to-be-delayed sequence set generated by the above method may indicate the position of the first bit to the last bit of the target sequence in the optical binary sequence.

Figure 3:
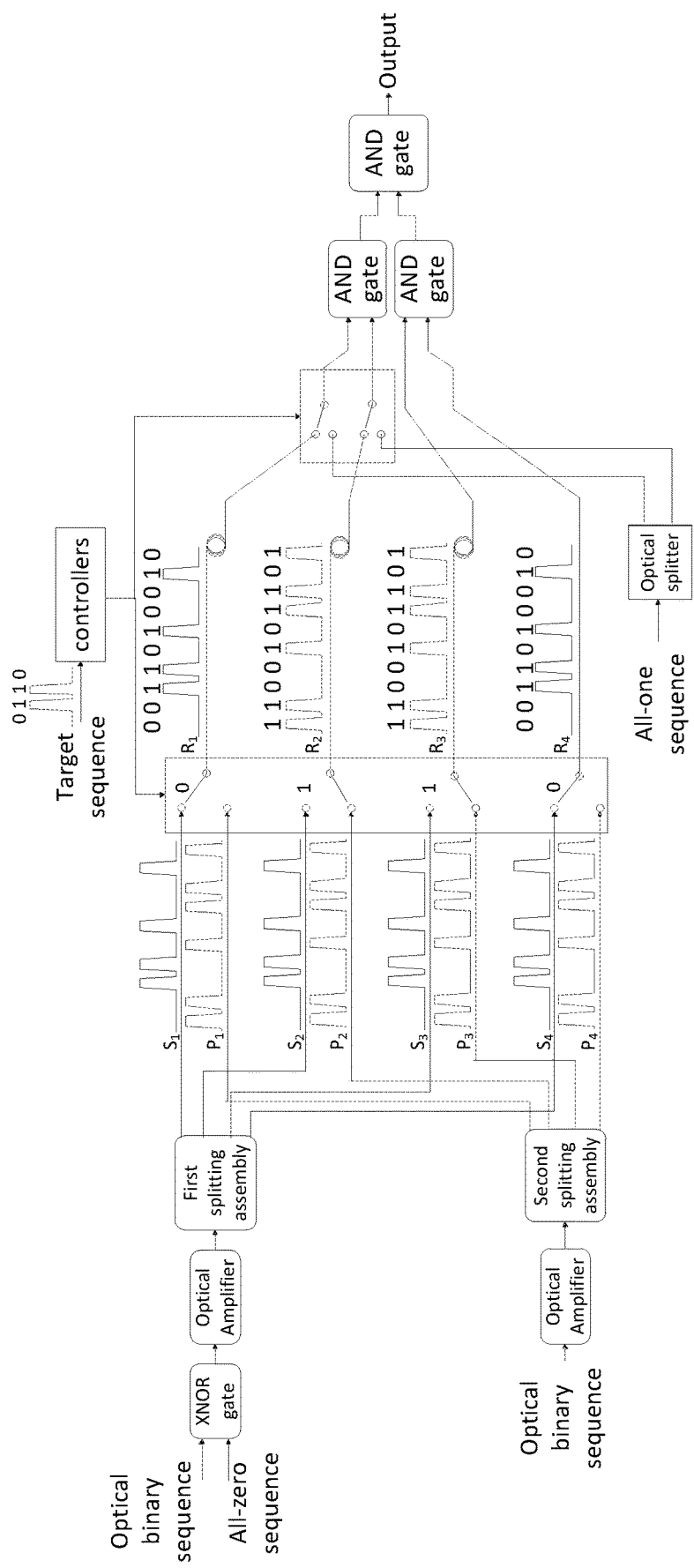
FIG. 3 is a diagram illustrating the process for generating the to-be-delayed sequence set according to some embodiments of the present disclosure.

The configuration method of the first optical switch array described above will now be described in detail by way of example with reference to FIG. 3. As shown in FIG. 3, the above target sequence B={0,1,1,0} is input into the first controller, and the first controller configures four two-to-one optical switches in the 4*1 two-to-one optical switch array (first optical switch array) according to the number of bits of the target sequence and the value of each bit. Specifically, the first controller extracts the values from the first bit of the target sequence up to the last bit of the target sequence, i.e., '0', '1', '1', '0', respectively. The first controller sends configuration commands to the four two-to-one optical switches in the 4*1 two-to-one optical switch array based on the four bits of the target sequence. According to the first bit '0' of the target sequence, the first controller may send a configuration command C='0' to the first two-to-one optical switch (the first row) in the 4*1 two-to-one optical switch array to enable the two-to-one optical switch to gate the sequence from the first candidate sequence set. According to the second bit '1' of the target sequence, the first controller may send a configuration command C='1' to the second two-to-one optical switch (the second row) in the 4*1 two-to-one optical switch array to enable the two-to-one optical switch to gate the sequence from the second candidate sequence set. According to the third bit '1' of the target sequence, the first controller may send a configuration command C='1' to the third two-to-one optical switch (the third row) in the 4*1 two-to-one optical switch array to enable the two-to-one optical switch to gate the sequence in the second candidate sequence set. And the first controller may send a configuration command C='0' to the last two-to-one switch (the fourth row) in the 4*1 second optical switch array according to the fourth bit from the first candidate sequence set. The two-to-one optical switches in the 4*1 two-to-one optical switch array may select four sequences from eight sequences as the to-be-delayed sequence set $R^U=\{R_1, R_2, R_3, R_4\}$ according to the configuration commands sent by the first controller. In the to-be-delayed sequence set, $R_1=S_1=\{0,0,1,1,0,1,0,0,1,0\}$, $R_2=A_2=\{1,1,0,0,1,0,1,1,0,1\}$, $R_3=A_3=\{1,1,0,0,1,0,1,1,0,1\}$, $R_4=S_4=\{0,0,1,1,0,1,0,0,1,0\}$. The to-be-delayed sequence set $R^U$ indicates the positions of the first to last bits of the target sequence in the optical binary sequence.

In block 104, various delay durations of the binary sequences of the to-be-delayed sequence set are set in a descending manner, and a to-be-matched sequence set is generated by delaying each binary sequence of the to-be-delayed sequence set according to its specific delay duration.

In some embodiments, the to-be-delayed sequence set may include U binary sequences, and the delay duration miT can be set to the U binary sequences in a descending manner respectively; wherein T is a bit period of the optical binary sequence; mi is a decreasing coefficient corresponding to the ith binary sequence to be delayed and mi=[U-1, U-2, . . . 0]. In particular, in some embodiments, the U binary sequences may be delayed by adding '0's in front of each sequence. Particularly, the number of '0's added to a binary sequence may equal to its corresponding decreasing coefficient mi.

Figure 4:
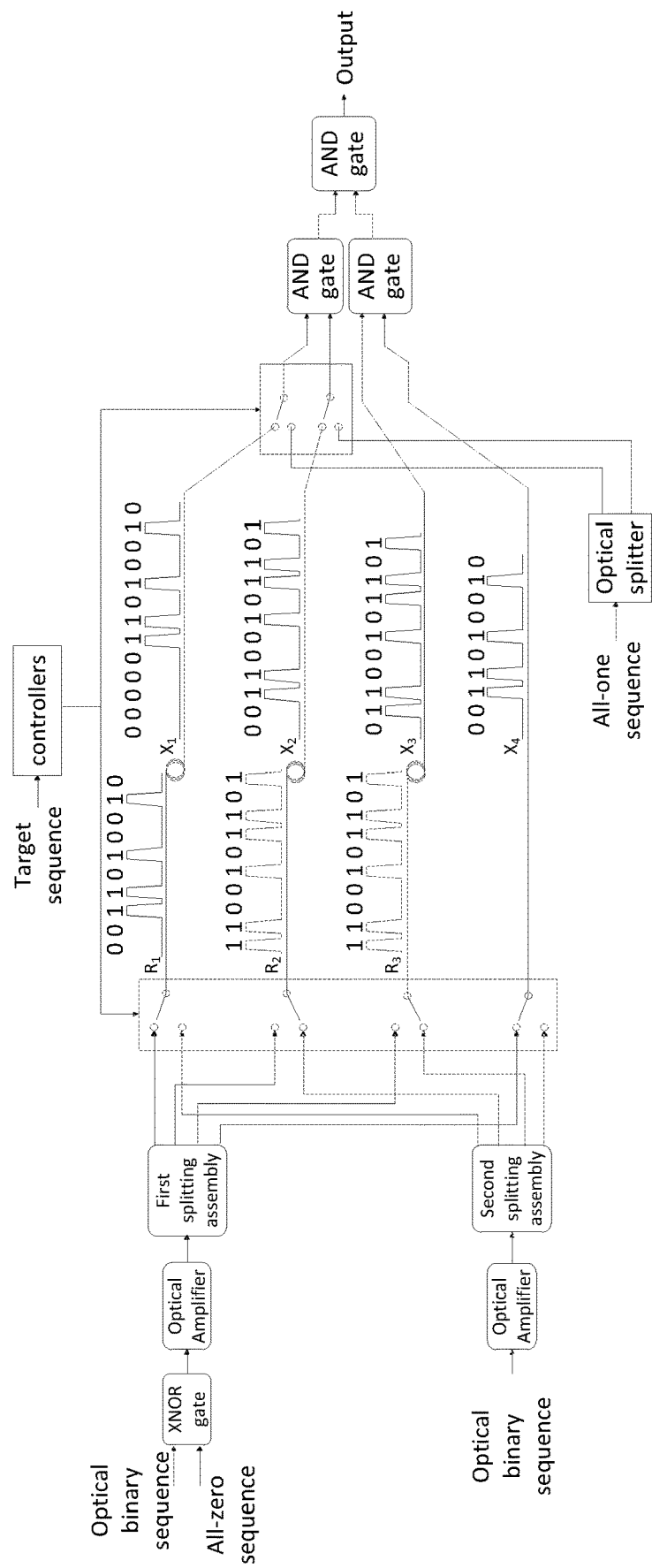
FIG. 4 is a diagram illustrating the process for generating the to-be-matched sequence set according to some embodiments of the present disclosure.

The method for delaying the sequences is described in detail with reference to the example of FIG. 4. As shown in FIG. 4, sequences $R_1$, $R_2$, $R_3$, $R_4$ of the to-be-delayed sequence set is respectively delayed by 3T, 2T, T and 0 after being processed through a delay circuit, wherein, T is a bit period of the optical binary sequence. As shown in FIG. 4, the delayed sequence is filled with zeros before the first bit of the binary sequence and the number of zeros filled is determined by the decreasing coefficient corresponding to the binary sequence. After being delayed, the to-be-matched sequence set $X^U=X_1, X_2, X_3, X_4$ is generated, wherein $X_1=\{0,0,0,0,0,1,1,0,1,0,0,1,0\}$, $X_2=\{0,0,1,1,0,0,1,0,1,1,0,1\}$, $X_3=\{0,1,1,0,0,1,0,1,1,0,1\}$, $X_4=\{0,0,1,1,0,1,0,0,1,0\}$.

It can thus be seen that the lengths of the four binary sequences are sequentially reduced by one bit from the first to the last, i.e. the length of the first sequence is 13 bits, the length of the second sequence is 12 bits, and so on, the length of the fourth sequence is 10 bits. Since N=4, the four binary sequences contain the information of the target sequence.

In block 105, an AND operation is performed on the binary sequences in the to-be-matched sequence set to generate a final sequence.

In some embodiments, the binary sequences in the to-be-matched sequence set described above may be performed by a serial AND operation or a parallel AND operation. Specific methods of the AND operation will be described in detail later.

In block 106, the number and the position of the target sequence contained in the optical binary sequence are determined according to the number and the position of a pulse in the final sequence.

In some embodiments, when a pulse is included in the final sequence, it may be determined that at least one target sequence is contained in the optical binary sequence. Specifically, the number of target sequences contained in the optical binary sequence can be determined according to the number of pulses in the final sequence; and the position of the last bit of each target sequence in the optical binary sequence can be determined according to the position of each pulse in the final sequence.

To be noted that the number of pulses in the final sequence is the number of target sequences contained in the optical binary sequence. The position of each pulse in the final sequence indicates the position of the last bit of each target sequence contained in the binary sequence. Therefore, the number and the position of the target sequence contained in the optical binary sequence can be directly determined according to the number and the position of a pulse in the final sequence.

As can be seen from the above description, in the target sequence identification method provided by the embodiments of the present disclosure two candidate sequence sets can be generated by one XNOR operation and optical splitting operations without repeatedly performing XNOR operations, thereby the matching time of binary sequences can be greatly reduced and the efficiency of target sequence identification is greatly improved. In addition, in the target sequence identification method provided by the embodiments of the present disclosure the final sequence can be generated by adopting the method for performing an AND operation on the binary sequences in the to-be-matched sequence set, without performing AND operations repeatedly and circularly, so that no interference pulse may be generated, and the output result may be clearer and more accurate.

The implementation of the AND operation described above in block 105 will now be described in detail, by way of example, with reference to the accompanying drawings.

In some embodiments, it is assumed that the to-be-matched sequence set contains P binary sequences to be matched, then the implementation method of the AND operation in block 105 may include the following steps.

Each of the first P-L binary sequences in the to-be-matched sequence set is paired with an all-one sequence to form P-L to-be-matched sequence pairs.

After the P-L to-be-matched sequence pairs are generated, one binary sequence is selected from each of the P-L to-be-matched sequence pairs according to the length of the target sequence as P-L binary sequences in the input sequence set.

In some embodiments, when the length N of the target sequence equals to the minimum length of the target sequence L set by the system, for each of the P-L to-be-matched sequence pairs, the all-one sequence may be selected. When the length N of the target sequence equals to the maximum length of the target sequence P set by the system, for each of the P-L to-be-matched sequence pairs, the binary sequence from the to-be-matched sequence set may be selected. And when the length N of the target sequence is smaller than P but larger than L, for each of the first P-N to-be-matched sequence pairs of the P-L to-be-matched sequence pairs, the all-one sequence may be selected; and for all the other N-L sequence pairs, the binary sequence from the to-be-matched sequence set may be selected.

Figure 5:
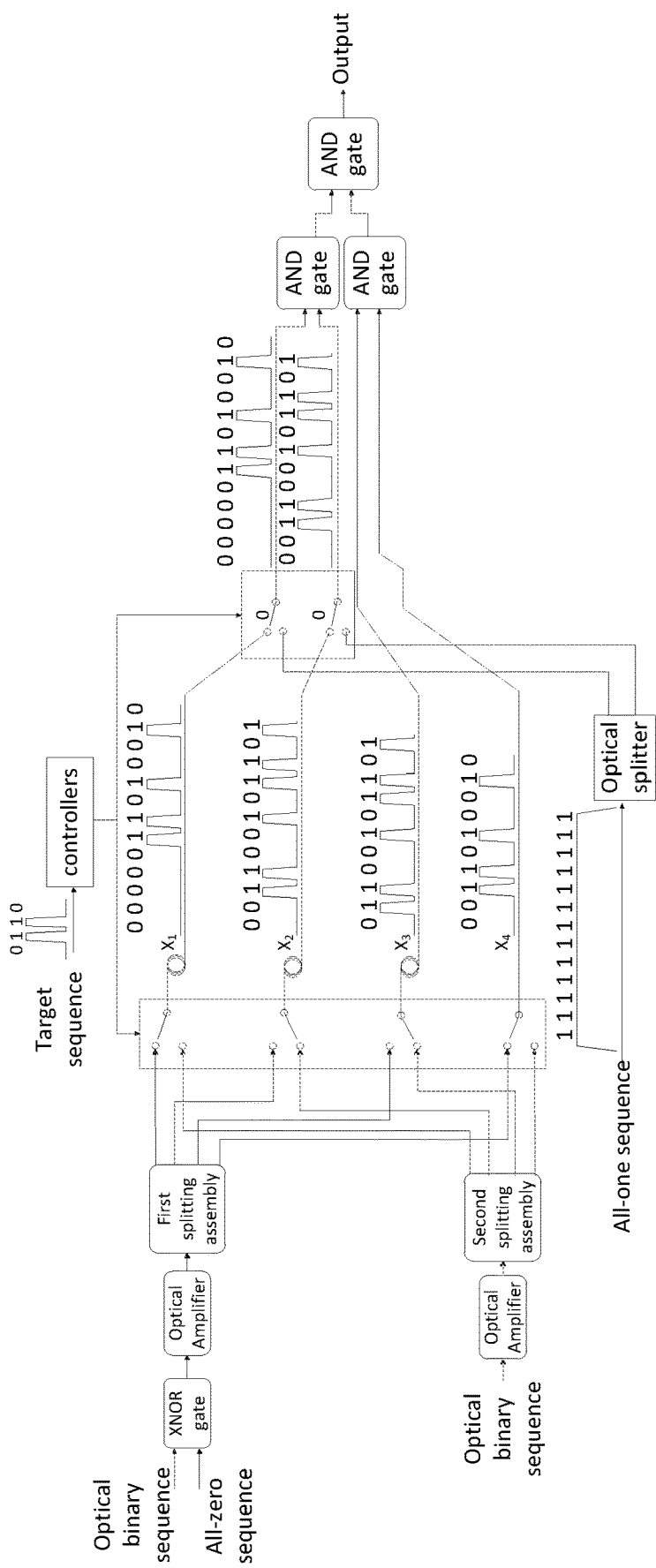
FIG. 5 is a diagram illustrating the process for generating the input sequence set according to some embodiments of the present disclosure.

A method for generating an input sequence set is described in detail below by way of example with reference to FIG. 5. As shown in FIG. 5, the maximum length of the target sequence P is set to 4 and the minimum length of the target sequence L is set to 2, and a second controller may be used to configure two two-to-one optical switches in a second optical switch array according to the length of target sequence. And the second controller may send configuration commands C='0' to the two two-to-one optical switches in the second optical switch array according to the length of the target sequence N which equals to 4. And the two-two-one optical switches are used for gating sequences from the to-be-matched sequence set as the two binary sequences of the input sequence set.

In some embodiments, the steps described above may be implemented by a second optical switch array and an all-one sequence set generator. The second optical switch array may include P-L two-to-one optical switches, and the second optical switch array may be controlled by a second controller according to the length of the target sequence. Each of the P-L binary sequences in the to-be-matched sequence set may serve as one input of one of the P-L two-to-one optical switches. The all-one sequence set generator may be used for generating P-L all-one sequences, each of which serves as the other input of each of the P-L two-to-one optical switches. And the output of the P-L two-to-one optical switches and the remaining L sequences from the to-be-matched sequence set may serve as the inputs of a first AND gate array or a second AND gate array.

After the binary sequence is selected, a final sequence is generated by performing an AND operation on the P-L binary sequences of the input sequence set and the remaining L binary sequences from the to-be-matched sequence set.

As previously mentioned, the AND operation described above may be a serial AND operation.

Figure 6:
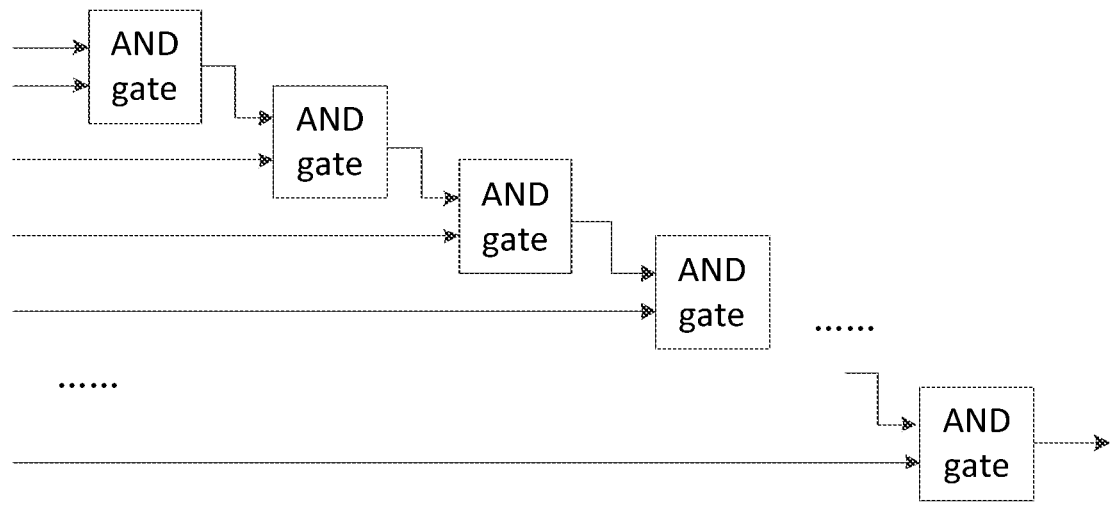
FIG. 6 is a diagram illustrating the structure of an apparatus for performing a serial AND operation according to some embodiments of the present disclosure.

FIG. 6 shows the structure of an apparatus implementing a serial AND operation according to an embodiment of the present disclosure. As shown in FIG. 6, in order to implement a serial AND operation on P binary sequences as described above, a first AND gate array may be provided. The first AND gate array may include P−1 AND logic gates (also referred to AND gates) serially arranged, wherein each AND gate includes two inputs and one output. And the P−1 AND gates are divided into 1 to P−1 levels, wherein the output of the AND gate of an upper level serves as one input of the AND gate of a lower level. In some embodiments, two binary sequences of the P binary sequences are used as two inputs of a first level AND gate; and taking the remaining P−2 binary sequences of the P binary sequences as the other input of the second to the (P−1)th level AND gate respectively, wherein the output of the (P−1)th level AND gate serves as the output of the serial AND operation.

With the structure shown in FIG. 6, the AND operation described above in block 105 may include: firstly, an AND operation is carried out on a first binary sequence and a second binary sequence to be subjected to the AND operation; then a second AND operation is carried out on a first result of the above AND operation and a third binary sequence to be subjected to the AND operation; and then a third AND operation is carried out on a second result of the second AND operation and a fourth binary sequence to be subjected to the AND operation, and circulating the above procedure until an AND operation is carried out on the last of the P binary sequences, so that the result binary sequence generated from the AND operation is the final sequence.

As described above, in addition to the serial AND operation described above, the AND operation described above may also be a parallel AND operation.

Figure 7:
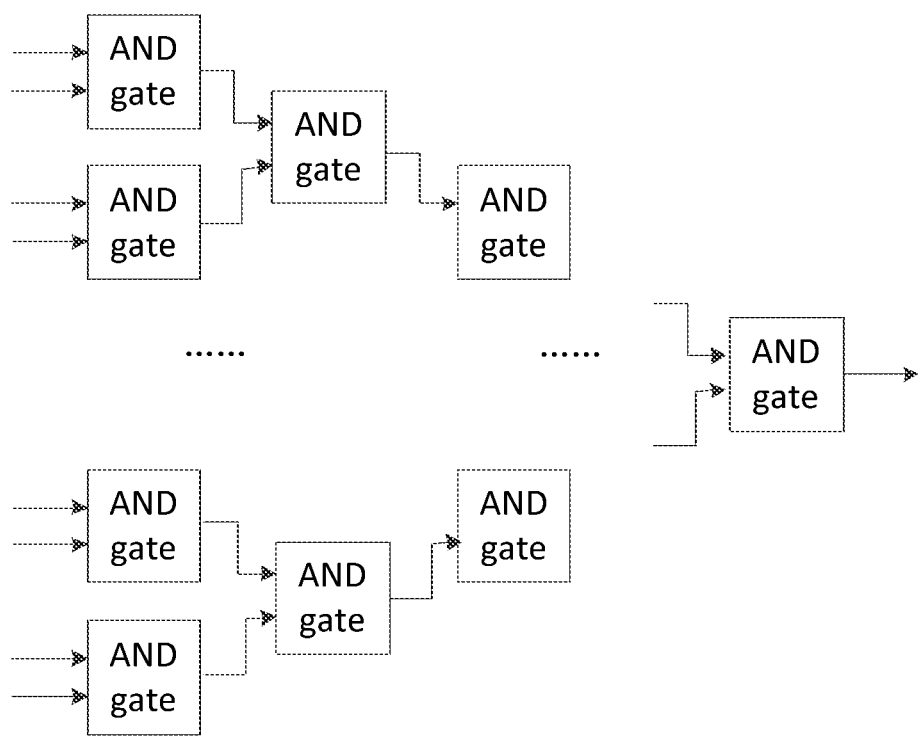
FIG. 7 is a diagram illustrating the structure of an apparatus for performing a parallel AND operation according to some embodiments of the present disclosure.

FIG. 7 shows the structure of an apparatus for implementing a parallel AND operation according to an embodiment of the present disclosure. As shown in FIG. 7, in order to implement the parallel AND operation on the P binary sequences as described above, a second AND gate array may be provided. The second AND gate array may include P−1 AND gates which are connected in parallel, and the P−1 AND gates are divided into 1 to K levels, wherein K=⌈log 2P⌉ and ⌈ ⌉ represents an upward rounding operation. Wherein the outputs of an upper level AND gate can serve as the inputs of a lower level AND gate.

With the structure shown in FIG. 7, the AND operation described above in block 105 may include: AND operations are performed on each two of the P-L binary sequences in the input sequence set and the remaining L binary sequences in the to-be-matched sequence set, and AND operations are then performed on the results of the above AND operations until a final sequence is generated.

Figure 8:
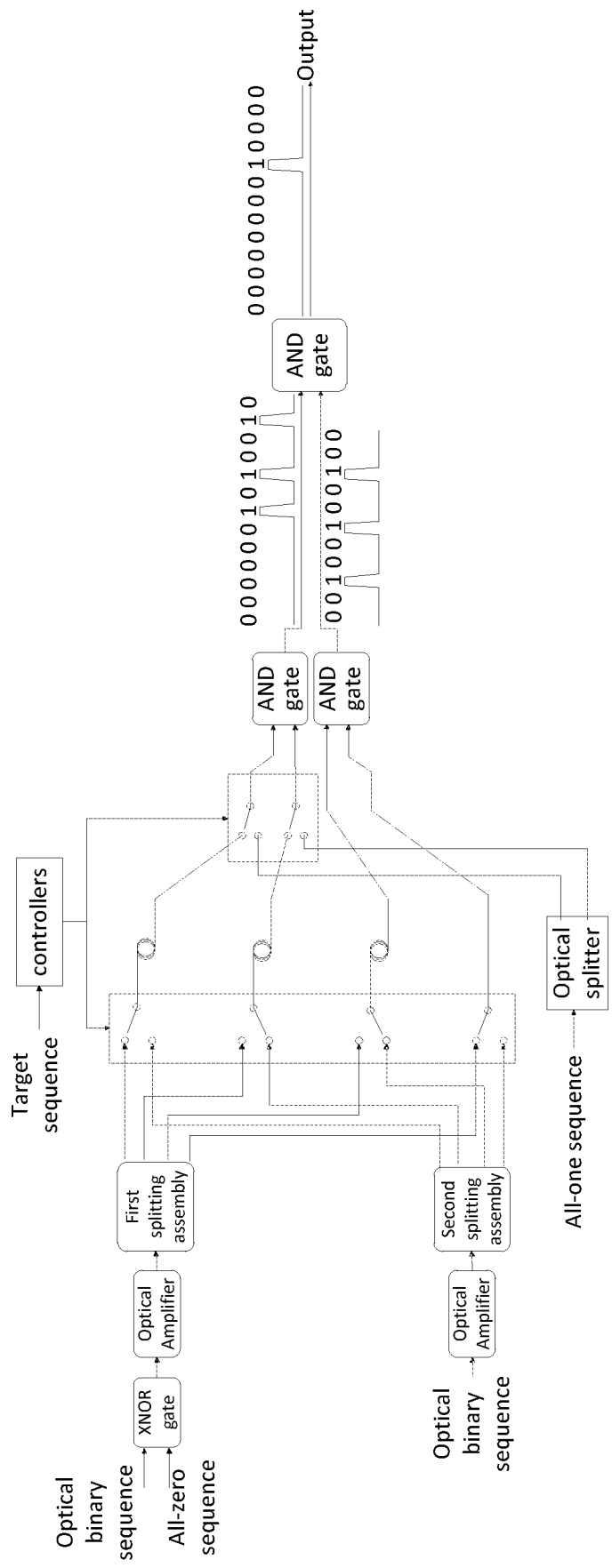
FIG. 8 is a diagram illustrating the process of a parallel AND operation according to some embodiments of the present disclosure.

The method for generating the final sequence is described in detail below by way of example with reference to FIG. 8. As shown in FIG. 8, the two binary sequences in the input sequence set and the last two sequences in the to-be-matched sequence set are subjected AND operations. Specifically, sequence $X_1$ and $X_2$ would be input into a first AND gate, and a first result sequence {0,0,0,0,0,0,1,0,1,0,0,1,0} would be generated. Sequence $X_3$ and $X_4$ would be input into a second AND gate, and a second result sequence {0,0,1,0,0,1,0,0,1,0,0} would be generated. Then, the first result sequence and the second result sequence would be input to a third AND gate, and the final sequence Y={0,0,0,0,0,0,0,0,1,0,0,0,0} may be generated.

As shown in FIG. 8, since there is but only one pulse in the final sequence Y, it is indicated that only one target sequence is contained in the optical binary sequence. And since the position where the pulse appears is the 9th bit, it can be determined that the position of the last bit of the target sequence is on the 9th bit of the optical binary sequence.

The identification method of the above-described target sequence is further described below with reference to the drawings and examples. FIGS. 9-13 illustrate specific examples of a target sequence identification method provided by some other embodiments of the present disclosure.

As stated above, the target sequence identification method provided by some embodiments of the present disclosure may include the following steps.

Firstly, as shown in blocks 101 and 102, an XNOR operation is performed on an optical binary sequence and an all-zero sequence. And then a result sequence of the XNOR operation is split into multiple binary sequences to generate a first candidate sequence set. And a second candidate sequence set may also be generated by splitting the optical binary sequence into multiple binary sequences.

Figure 9:
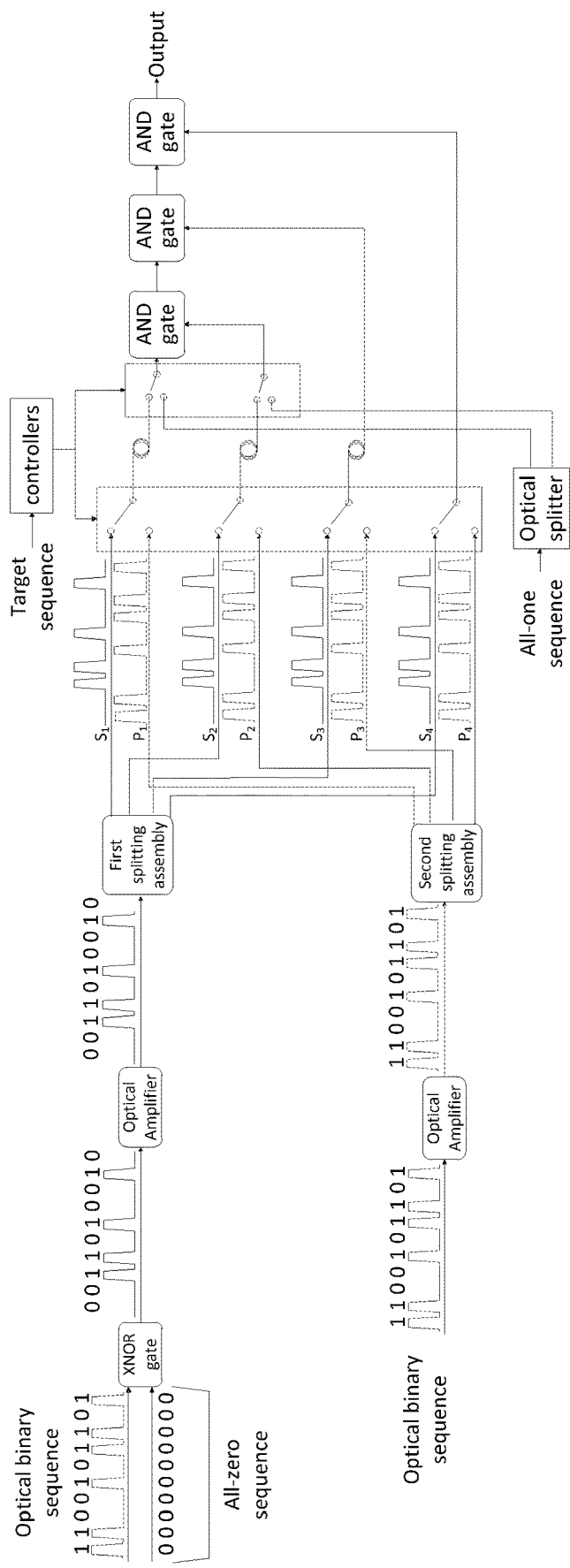
FIG. 9 is a diagram illustrating the process for generating candidate sequence sets according to some embodiments of the present disclosure.

As shown in FIG. 9, the optical binary sequence may be set as A={1,1,0,0,1,0,1,1,0,1}. The target sequence may be set as B={0,1,1} with the length of N=3. The maximum length of the target sequence that can be identified by the system may be set as P=4, and the minimum length of the target sequence that can be identified by the system may be set as L=2. In this case, the binary sequence A={1,1,0,0,1,0,1,1,0,1} and an all-zero sequence {0,0,0,0,0,0,0,0,0,0} may be input into an XNOR gate to generate an initial sequence S={0,0,1,1,0,1,0,0,1,0}.

Almost at the same time, the optical binary sequence A={1,1,0,0,1,0,1,1,0,1} may be input into the system as a second initial sequence. The initial sequence S and the second initial sequence A may be then input into two optical amplifiers respectively. During the power amplifying, the sequences themselves do not change, and only their powers are amplified by several times. And then two candidate sequence sets would be generated after the initial sequences are split by two optical splitting assemblies. Specifically, the initial sequence S is split into four sequences by a first optical splitting assembly, which forms a first candidate sequence set $S^U=\{S_1, S_2, S_3, S_4\}$, wherein, $S_1=S_2=S_3=S_4=\{0,0,1,1,0,1,0,0,1,0\}$. And the second initial sequence A is split into four sequences by a second optical splitting assembly, which forms a second candidate sequence set $A^U=\{A_1, A_2, A_3, A_4\}$, wherein, $A_1=A_2=A_3=A_4=\{1,1,0,0,1,0,1,1,0,1\}$.

After the first candidate sequence set and the second candidate sequence set are generated, binary sequences are selected from the first candidate sequence set and the second candidate sequence set according to the target sequence, and then a to-be-delayed sequence set is generated in block 103.

Figure 10:
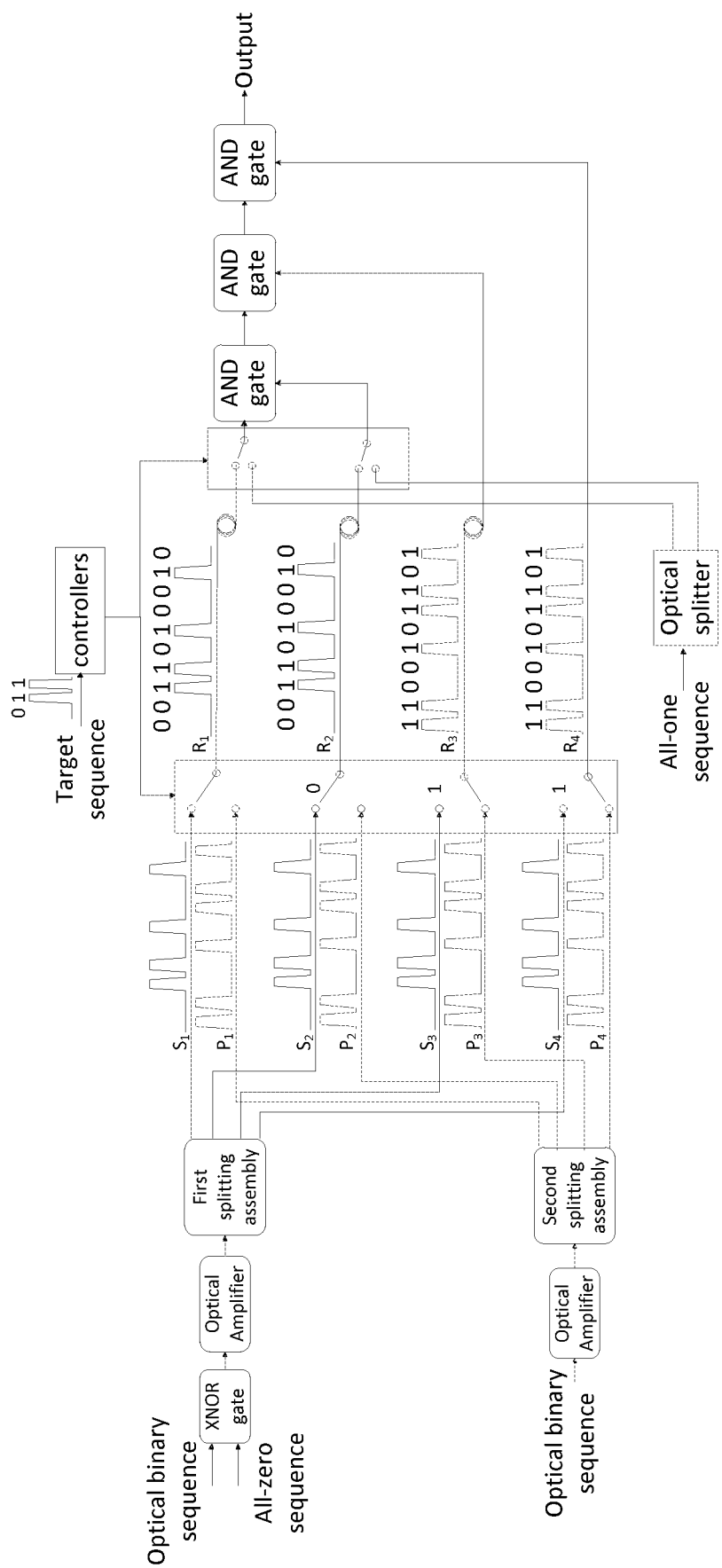
FIG. 10 is a diagram illustrating the process for generating the to-be-delayed sequence set according to some embodiments of the present disclosure.

As shown in FIG. 10, the target sequence B={0,1,1} is input into a first controller. In one aspect, the first controller configures multiple two-to-one optical switches in a 4*1 two-to-one optical switch array according to the length of the target sequence and each bit of the target sequence. The first controller first extracts each bit (from the first bit to the last bit) of the target sequence of the target sequence, i.e., '0', '1', and '1'. Based on the 3 bits extracted, the first controller sends configuration commands to the last 3 two-to-one optical switches in the 4*1 two-to-one optical switch array. Specifically, the first controller would send a configuration command C='0' to the second two-to-one optical switch (the second row) in the 4*1 two-to-one optical switch array according to the first bit '0' of the target sequence to enable the two-to-one optical switch to gate the binary sequence from the first candidate sequence set. The first controller would send a configuration command C='1' to the third two-to-one optical switch (the third row) in the 4*1 two-to-one optical switch array according to the second bit '1' of the target sequence to enable the two-to-one optical switch to gate the binary sequence from the second candidate sequence set. And the first controller would send a configuration command C='1' to the fourth two-to-one optical switch (the fourth row) in the 4*1 two-to-one optical switch array according to the third bit '1' of the target sequence to enable the two-to-one optical switch to gate the binary sequence from the second candidate sequence set. In addition, the first two-to-one optical switch (the first row) in the 4*1 two-to-one optical switch array does not receive any configuration command and therefore keeps the initial state to select the upper input end, and thus the binary sequence in the first candidate sequence set would be gated. The two-to-one optical switches in the 4*1 two-to-one optical switch array would select 4 binary sequences among 8 binary sequences to form a to-be-delayed sequence set $R^U=\{R_1, R_2, R_3, R_4\}$, wherein, $R_1=S_1=\{0,0,1,1,0,1,0,0,1,0\}$, $R_2=S_2=\{0,0,1,1,0,1,0,0,1,0\}$, $R_3=A_3=\{1,1,0,0,1,0,1,1,0,1\}$, $R_4=A_4=\{1,1,0,0,1,0,1,1,0,1\}$.

After the to-be-delayed sequence set is generated, in block 104, various delay durations would then be configured for the binary sequences of the to-be-delayed sequence set in a decreasing manner. And a to-be-matched sequence set would be generated after each sequence in the to-be-delayed sequence set is delayed according to its specific delay duration.

Figure 11:
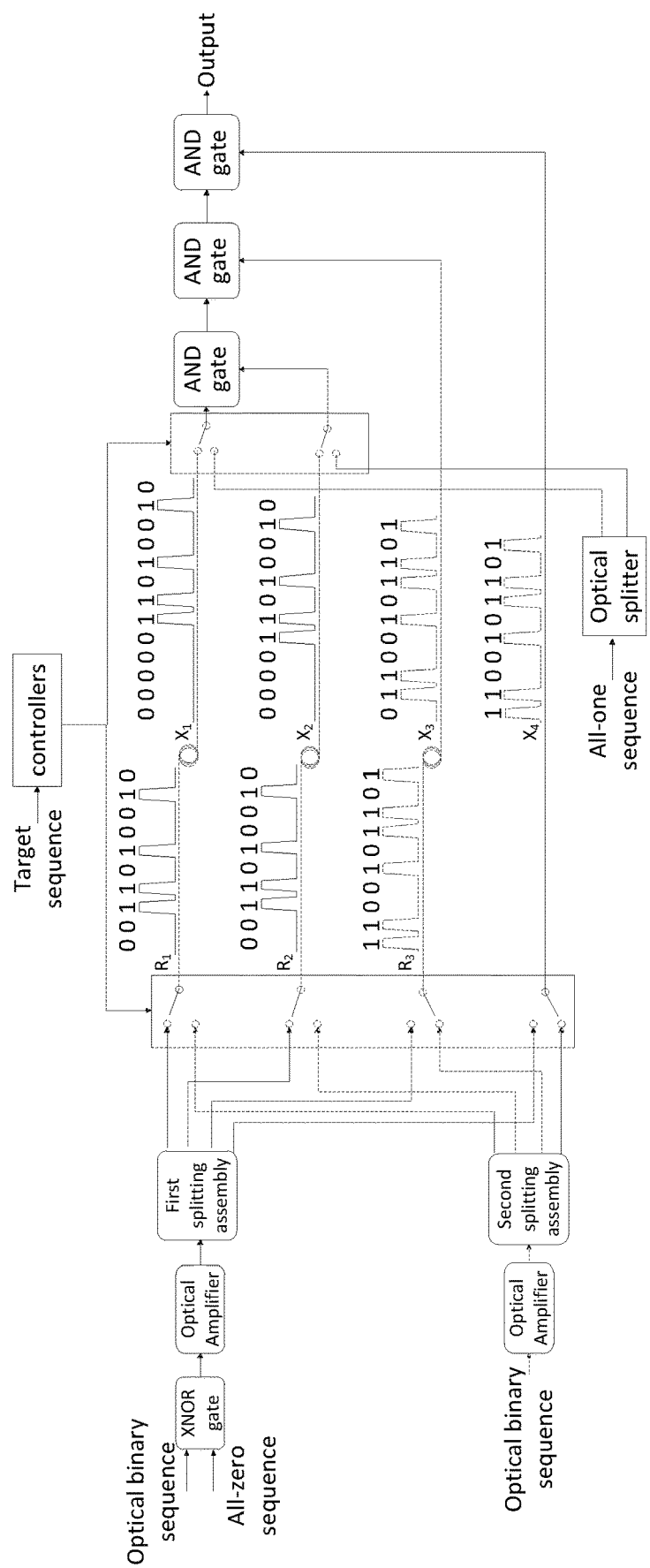
FIG. 11 is a diagram illustrating the process for generating the to-be-matched sequence set according to some embodiments of the present disclosure.

As shown in FIG. 11, each sequence $R_1, R_2, R_3, R_4$ of the to-be-delayed sequence set $R^U$ is delayed by 3T, 2T, T and 0 respectively through a delay circuit. So that sequences $X_1, X_2, X_3, X_4$ of the to-be-matched sequence set $X^U$ would be generated, wherein, $X_1=\{0,0,0,0,0,1,1,0,1,0,0,1,0\}$, $X_2=\{0,0,0,0,1,1,0,1,0,0,1,0\}$, $X_3=\{0,1,1,0,0,1,0,1,1,0,1\}$, $X_4=\{1,1,0,0,1,0,1,1,0,1\}$.

After the to-be-matched sequence set is generated, in block 105, the first P-L binary sequences in the to-be-matched sequence set would be paired with an all-one sequence set and then input into a second optical switch array in pairs to generate an input sequence set.

Figure 12:
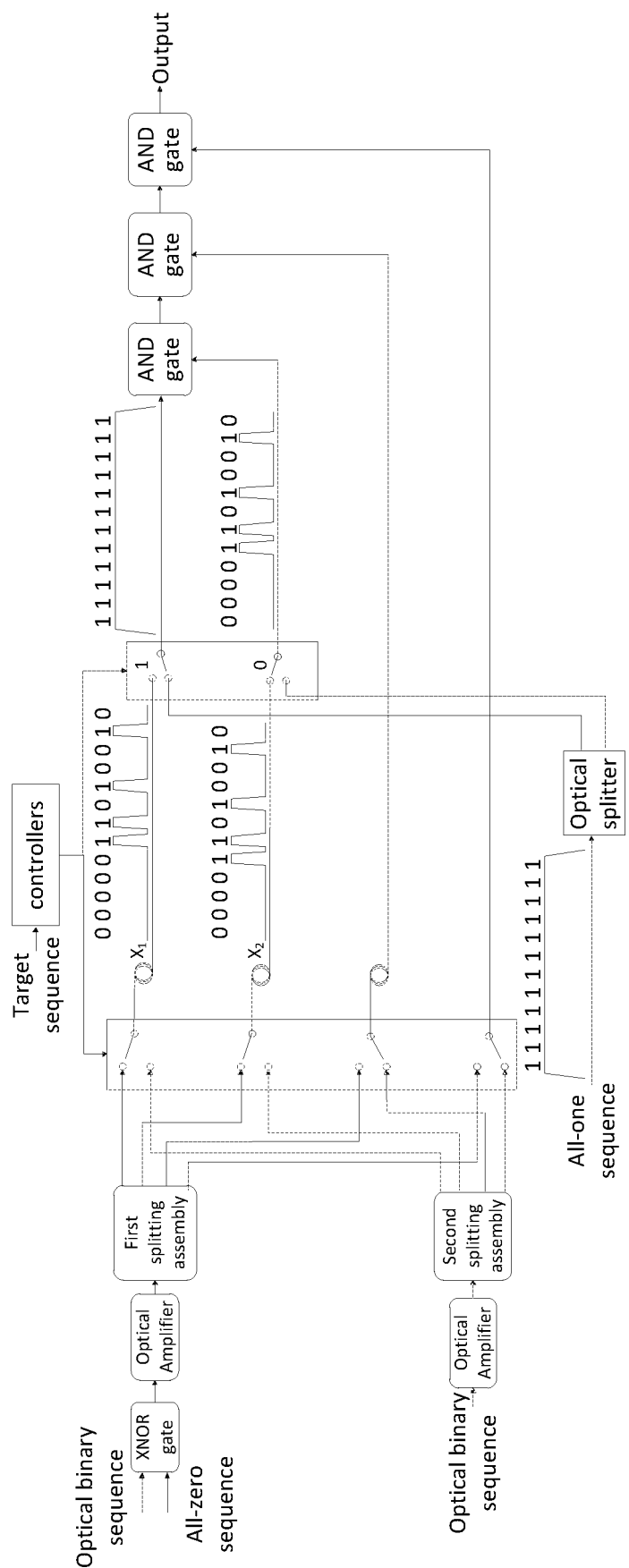
FIG. 12 is a diagram of illustrating the process for generating the input sequence set according to some embodiments of the present disclosure.

As shown in FIG. 12, the maximum length of the target sequence that can be identified by the system is P which equals to 4 and the minimum length of the target sequence that can be identified by the system is L which equals to 2. And the second controller would configure two-to-one optical switches of the second optical switch array according to the length of the target sequence. Specifically, the second controller would send a configuration command C='1' to the first two-to-one optical switch (the first row) in the second optical switch array according to the length N=3 of the target sequence, which enables the first two-to-one optical switch to gate the all-one sequence. And the second controller would send a configuration command C='0' to the second two-to-one optical switch (the second row) in the second optical switch array according to the length N=3 of the target sequence, which enables the second two-to-one optical switch to gate the binary sequence in the to-be-matched sequence set. Therefore, the input sequence sets with two binary sequences would be generated.

And after the input sequence set is generated, an AND operation would be performed on the binary sequences of the input sequence set and the last L binary sequences in the to-be-matched sequence set until a unique output sequence is generated which would be regarded as a final sequence.

Figure 13:
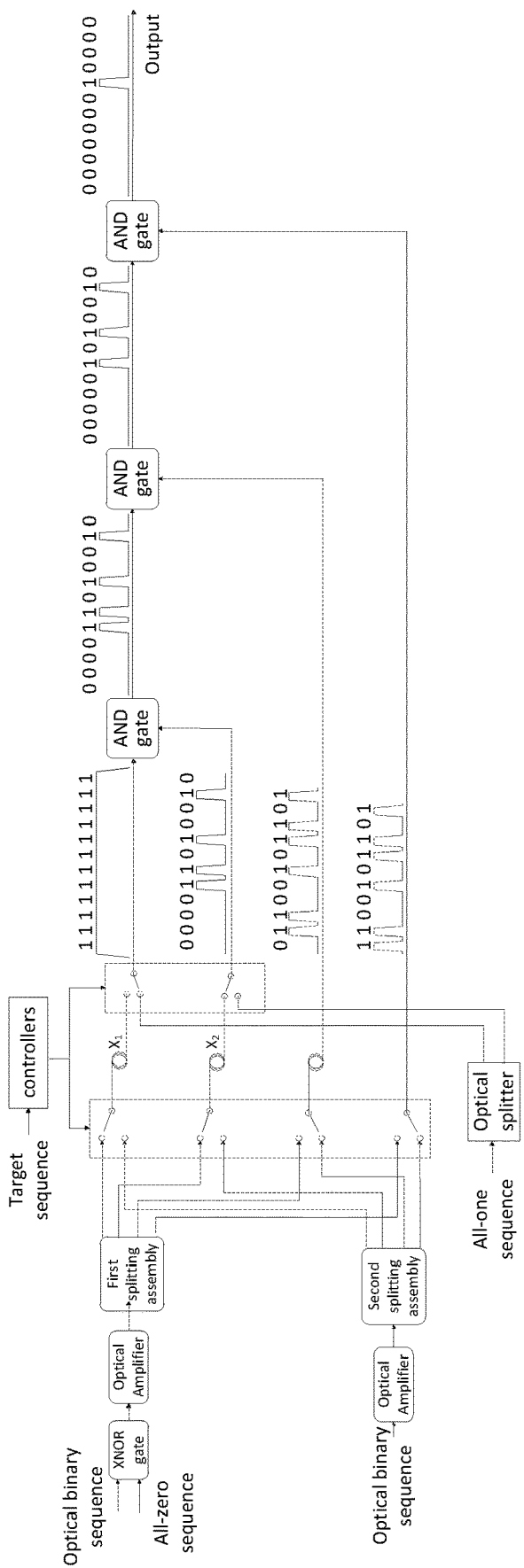
FIG. 13 is a diagram illustrating the process of a serial AND operation according to some embodiments of the present disclosure.

As shown in FIG. 13, the AND operation may refer to a serial AND operation. That is, a first AND operation would be performed on a first two binary sequences in the input sequence sets. And since the second controller configures the first two-to-one optical switch to gate the all-one sequence and configures the second two-to-one optical switch to gate the binary sequence in the to-be-matched sequence set in the previous steps. The first two-to-one optical switch will output an all-one sequence, and the second two-to-one optical switch will output the sequence $X_2$ in the to-be-matched sequence set. Therefore, these two binary sequences would be input into a first AND gate to get a first result sequence {0,0,0,0,1,1,0,1,0,0,1,0}. And the above first result sequence and a sequence $X_3$ in the to-be-matched sequence set would be input into a second AND gate for an AND operation. And a second result sequence {0,0,0,0,0,1,0,1,0,0,1,0} can be generated. And then the above second result sequence and a sequence $X_4$ in the to-be-matched sequence set would be input into a third AND gate for an AND operation. And the final sequence Y={0, 0,0,0,0,0,0,1,0,0,0,0} can be generated.

In block 106 illustrated above, the target sequence contained in the binary sequence would then be determined by analyzing the number of pulses and the position of each pulse in the final sequence.

As shown in FIG. 13, since there is but only one pulse in the final sequence Y, it is indicated that the binary sequence contains only one target sequence. And since the position where the pulse occurs is the 8th bit, it can be generated that the position of the last bit of the target sequence in the binary sequence is on the 8th bit of the optical binary sequence.

According to the target sequence identification method provided by the present disclosure, controllers are used for configuring the two-to-one switches in the optical switch array so as to realize matching of a target sequence with variable length. Further, candidate sequence sets are generated by utilizing an XNOR gate and optical splitting assemblies. A to-be-matched sequence set is generated from the candidate sequence sets by utilizing a first switch array, a second switch array and a time delay circuit. Finally, whether a target sequence exists in the optical binary sequence or not can be judged by adopting an AND operation. In the above procedure, neither repeated XNOR operations nor cyclic AND operations are needed, and thus no interference pulses will be generated. Therefore, the target sequence can be identified quickly and accurately, the time for target sequence identification is effectively shortened, and the efficiency of target sequence identification is improved.

Figure 14:
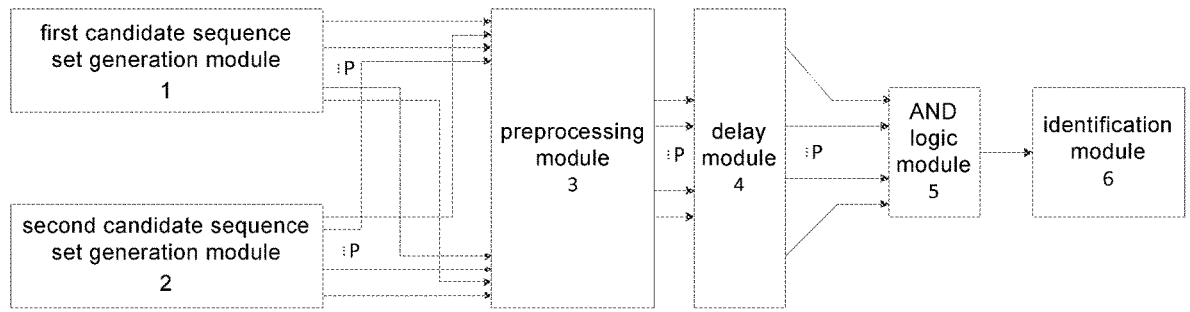
FIG. 14 is a schematic diagram illustrating the structure of a target sequence identification device according to some embodiments of the present disclosure.

On another aspect, based on any of the above target sequence identification methods, some embodiments of the present disclosure also provide a device for target sequence identification. As shown in FIG. 14, the target sequence identification device according to some embodiments of the present disclosure includes: a first candidate sequence set generation module 1, a second candidate sequence set generation module 2, a preprocessing module 3, a delay module 4, an AND logic module 5 and an identification module 6.

In some embodiments, the first candidate sequence set generation module 1 is for performing an XNOR operation on an optical binary sequence and an all-zero sequence and then splitting the result sequence of the XNOR operation to generate a first candidate sequence set; wherein, the number of binary sequences in the first candidate sequence set is equal to the maximum length P of the target sequence that can be identified.

In some embodiments, the second candidate sequence set generation module 2 is for splitting the optical binary sequence to generate a second candidate sequence set; wherein, the number of binary sequences in the second candidate sequence set is the same as the number of binary sequences in the first candidate sequence set.

In some embodiments, the preprocessing module 3 is for pairing the binary sequences from the first candidate sequence set and those from the second candidate sequence set to generate P binary sequence pairs; and then selecting a binary sequence from each of the P binary sequence pairs according to the target sequence to generate a to-be-delayed sequence set.

In some embodiments, the delay module 4 is for configuring various delay duration for the binary sequences of the to-be-delayed sequence set in a descending manner, and then generating a to-be-matched sequence set by delaying the binary sequences of the to-be-delayed sequence set respectively according to their specific delay durations.

In some embodiments, the AND logic module 5 is for performing an AND operation on the binary sequences in the to-be-matched sequence set to generate a final sequence.

In some embodiments, the identification module 6 is for determining the number and the position of the target sequence in the binary sequence according to the number and position of a pulse in the final sequence.

Figure 15:
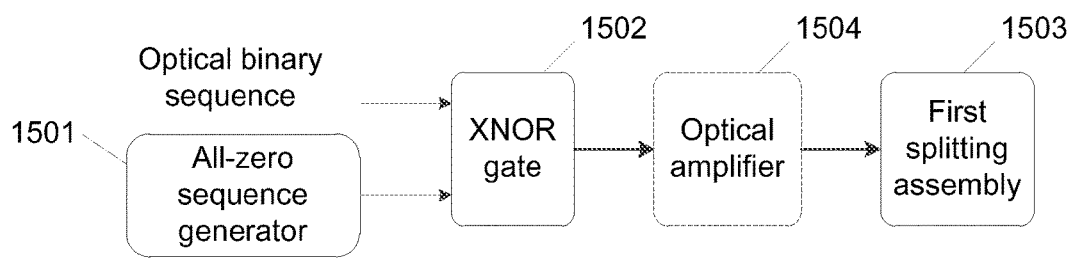
FIG. 15 is a schematic diagram illustrating the structure of the first candidate sequence set generation module according to some embodiments of the present disclosure.

In some embodiments, as shown in FIG. 15, the first candidate sequence set generation module 1 includes: an all-zero sequence generator 1501, an XNOR gate 1502, and a first optical splitting assembly 1503.

The all-zero sequence generator 1501 is to generate an all-zero sequence in the optical domain.

The binary sequence is input into one input of the XNOR gate 1502 and the all-zero sequence is input into the other input of the XNOR gate 1502, and an initial sequence is output by the XNOR gate 1502 after performing an XNOR operation on the two inputs. That is, the XNOR gate performs an XNOR operation on the optical binary sequence and the all-zero sequence input, and outputs an initial sequence.

The first optical splitting assembly 1503 includes at least one optical splitter. The initial sequence will be input into the first optical splitting assembly. The first optical splitting assembly 1503 splits the input to generate the first candidate sequence set.

In some embodiments of the present disclosure, the first candidate sequence generation module 1 may further include: an optical amplifier 1504 connected between the XNOR gate and the first optical splitting assembly. The optical amplifier 1504 would perform optical power amplification on the initial sequence output by the XNOR gate. The amplified initial sequence would then be output to the first optical splitting assembly.

In some embodiments of the present disclosure, the second candidate sequence set generation module 2 may include: a second optical splitting assembly. The second optical splitting assembly may include at least one optical splitter. The binary sequence would be input into the second optical splitting assembly. The second optical splitting assembly splits the input to generate the second candidate sequence set.

In some embodiments of the present disclosure, the second candidate sequence set generation module 2 may further include an optical amplifier connected to the input of the second optical splitting assembly. The optical amplifier may perform optical power amplification on the optical binary sequence, and then output the amplified binary sequence to the second optical splitting assembly.

Figure 16:
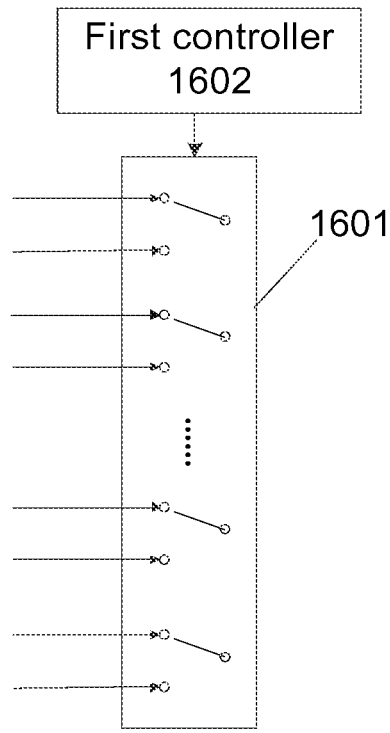
FIG. 16 is a schematic diagram illustrating the structure of the preprocessing module according to some embodiments of the present disclosure.

In some embodiment of the present disclosure, as shown in FIG. 16, the preprocessing module 3 may include: a first optical switch array 1601 and a first controller 1602.

The first optical switch array 1601 may include P two-to-one optical switches. For each of the P two-to-one optical switches, a binary sequence from the first candidate sequence set and a binary sequence from the second candidate sequence set would be input into it. And one binary sequence would be selected from the two inputs by the two-to-one optical switch. And the output of the P two-to-one optical switches would constitute the to-be-delayed sequence set. That is, each of the P two-to-one optical switches selects a binary sequence from a binary sequence of the first candidate sequence set and a binary sequence of the second candidate sequence set input, and output the binary sequence selected as one binary sequence in the to-be-delayed sequence set.

The first controller 1602 is to control the gating states of the P two-to-one optical switches in the first optical switch array 1601 according to the target sequence.

In some embodiments of the present disclosure, for the first P-N two-to-one optical switches, the first controller 1602 will control these P-N optical switches to gate the binary sequence from the first candidate sequence set. For the last N two-to-one optical switches of the P two-to-one optical switches, the first controller 1602 maps the N two-to-one optical switches to the N bits of the target sequence respectively. Specifically, when the value of the corresponding bit of the target sequence is '0', the first controller 1602 would control the two-to-one optical switch to gate the binary sequence from the first candidate sequence set; and when the value of the corresponding bit of the target sequence is '1', the first controller 1602 would control the two-to-one optical switch to gate the binary sequence from the second candidate sequence set.

In some embodiments of the present disclosure, the delay module 4 may include a configuration unit and a delay circuit.

The configuration unit may set various delay durations $m_i T$ for P binary sequences to be delayed in the to-be-delayed sequence set in a descending manner; wherein T is a bit period of the optical binary sequence; $m_i$ is a decreasing coefficient corresponding to the ith sequence to be delayed and $m_i = [P-1, P-2, \ldots 0]$.

And according to the setting of the configuration unit, the delay circuit delays the P binary sequences to be delayed respectively. Specifically, the delay circuit may add multiple zeros in front of each of the P binary sequences to be delayed, wherein for each of the P binary sequences, the number of zeros added in front of it may equal to its corresponding decreasing coefficient $m_i$. For example, for the ith binary sequence of the U binary sequences in the to-be-delayed sequence, the delay circuit adds $m_i$ zeros in front of the binary sequence.

Figure 17:
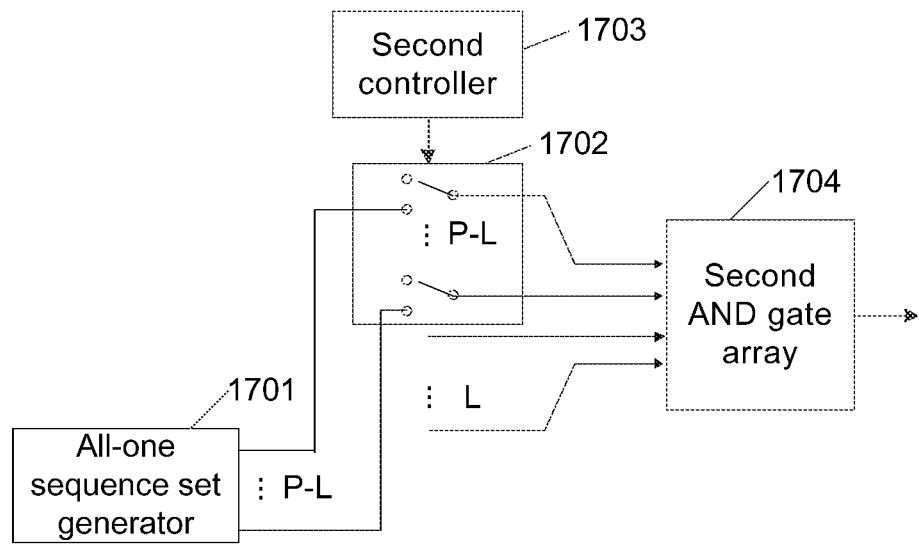
FIG. 17 is a schematic diagram illustrating the structure of the AND logic module according to some embodiments of the present disclosure.

In some embodiments of the present disclosure, as shown in FIG. 17, the AND logic module 5 may include an all-one sequence set generator 1701, a second optical switch array 1702, a second controller 1703, and an AND gate array 1704.

The all-one sequence set generator 1701 generates P-L all-one sequences in the optical domain.

The second optical switch array 1702 may include P-L two-to-one optical switches, wherein L is the length of the minimum target sequence that can be identified by the device. One input of each two-to-one optical switch is connected to one of the first P-L sequences from the to-be-matched sequence set, the other input of each two-to-one optical switch is connected to an all-one sequence. Each two-to-one optical switch may select one sequence to serve as an input of the AND gate array 1704.

The second controller 1703 may controls the gating states of the P-L two-to-one optical switches in the second optical switch array 1702 according to the length of the target sequence.

The AND gate array 1704 may perform an AND operation on the P-L binary sequences output by the second optical switch array 1702 and the last L binary sequences in the to-be-matched sequence set to generate a final sequence.

In some embodiments of the present disclosure, the AND gate array 1704 may be a first AND gate array. The first AND gate array may include P−1 AND gates connected in a serial cascade manner. In this manner, the output of a first AND gate of the P−1 AND gates serves as an input of a second AND gate; the output of the ith AND gate serves as an input of the (i+1)th AND gate; wherein i is an integer between 1 and P−2; the output of the (P−1)th AND gate serves as the output of the first AND gate array. The two inputs of the first AND gate and the other input of the second to (P−1)th AND gate serve as the P inputs of the first AND gate array. In some embodiments of the present disclosure, the first AND gate array described above may have the structure illustrated in FIG. 6.

In some embodiments of the present disclosure, the AND gate array 1704 may be a second AND gate array. The second AND gate array may include P−1 AND gates connected in a parallel cascade manner. In this manner, the P−1 AND gates are divided into K levels, wherein K=⌈log 2P⌉ and ⌈ ⌉ represents an upward rounding operation. The output of the AND gate in the ith level serves as the input of the AND gate in the (i+1)th level; wherein i is an integer between 1 and K−1. The inputs of the AND gates in the first level serve as the inputs of the second AND gate array; and the output of the AND gate in the Kth level serves as the output of the second AND gate array. In some embodiments of the present disclosure, the second AND gate array described above may have the structure illustrated in FIG. 7.

In some embodiments of the present disclosure, the above-described all-one sequence generator 1701 may include: and an all-one sequence generator for generating an all-one sequence in the optical domain and an optical splitter for splitting the all-one sequence into P-L all-one sequences.

In some embodiments of the present disclosure, the second controller 1703 controls the P-L two-to-one optical switches in the second optical switch array. The second controller 1703 may control the P-L two-to-one optical switches to gate the all-one sequence when the length N of the target sequence equals to L. The second controller 1703 may control the P-L two-to-one optical switches to gate the first P-L sequences to be matched of the to-be-matched sequence set when the length N of the target sequence equals to P. And when the length N of the target sequence is smaller than P but larger than L. The second controller 1703 may control the first P-N optical switches in the second optical switch array to gate the all-one sequence, and controlling the remaining N-L optical switches to gate the binary sequence from the to-be-matched sequence set.

As can be seen from the above technical schemes, in the target sequence identification device provided by the embodiments, an XNOR gate and optical splitting assemblies are used for one XNOR operation to generate candidate sequence sets. In the above process, no repeated XNOR operations are needed, therefore the time for matching the sequences is reduced, and the efficiency of sequence matching is improved. Further, by adopting a serial AND operation or a parallel AND operation, repeated cyclic AND operations are no longer required, thus the defect of interference pulses generated due to repeated cyclic AND operations can be overcome. That is, the output would be clearer and more accurate. Especially, by adopting the parallel AND operation, the time for sequence matching is further shortened, and the efficiency of sequence matching is further improved.

One ordinary skilled in the art will appreciate that the discussion of any of the above embodiments is merely exemplary and is not intended to imply that the scope of the disclosure (including the claims) is limited to these examples. The above embodiments or technical features in different embodiments may also be combined under the idea of the disclosure, the steps may be implemented in any order, and there are many other variations of different aspects of the disclosure as described above, which are not provided in detail for the sake of brevity.

In addition, well-known power/ground connections to integrated circuit (IC) chips and other components may or may not be shown in the figures provided for simplicity of illustration and discussion and to not obscure the present invention. Furthermore, means may be shown in block diagram form in order to avoid obscuring the invention, and this also takes into account the fact that details regarding implementations of such block diagram means are highly dependent on the platform in which the invention is to be implemented (i.e., such details should be well within the purview of one skilled in the art). While specific details (e.g., circuits) have been set forth in order to describe exemplary embodiments of the disclosure, it will be apparent to those skilled in the art that the invention may be practiced without these specific details or with variations of these specific details. Accordingly, the description is to be regarded as illustrative in nature, and not as restrictive.

While the embodiments have been described in conjunction with specific examples thereof, many alternatives, modifications and variations thereof will be apparent to those skilled in the art in light of the foregoing description. For example, other memory architectures (e.g., dynamic RAM (DRAM)) may be used in the embodiments discussed. The present embodiments are intended to embrace all such alternatives, modifications and variances that fall within the broad scope of the appended claims. Therefore, it is intended that any omissions, modifications, equivalents, improvements and the like be included within the spirit and scope of the present disclosure.

What is claimed is:

1. A method for target sequence identification, comprising:

performing an exclusive NOR (XNOR) operation on an optical binary sequence and an all-zero sequence;

generating a first candidate sequence set by splitting the result sequence of the XNOR operation into multiple binary sequences; wherein, the number U of binary sequences in the first candidate sequence set is not less than the length N of the target sequence;

generating a second candidate sequence set by splitting the optical binary sequence into multiple binary sequences; wherein, the number of binary sequences in the second candidate sequence set is the same as the number of binary sequences in the first candidate sequence set;

selecting U binary sequences from the first candidate sequence set and the second candidate sequence set according to the target sequence to generate a to-be-delayed sequence set;

configuring various delay durations for each binary sequence of the to-be-delayed sequence set in a descending manner;

generating a to-be-matched sequence set by delaying each binary sequence of the to-be-delayed sequence set according to its delay duration configured;

performing an AND operation on the binary sequences in the to-be-matched sequence set to generate a final sequence; and determining the number and position of the target sequence in the optical binary sequence according to the number and position of a pulse in the final sequence.

2. The method for target sequence identification according to claim 1, wherein, selecting U binary sequences from the first candidate sequence set and the second candidate sequence set according to the target sequence comprises:

matching each binary sequence in the first candidate sequence set with one binary sequence in the second candidate sequence set to generate U binary sequence pairs; and selecting one binary sequence from each of the U binary sequence pairs according to the target sequence to generate the to-be-delayed sequence set.

3. The method for target sequence identification according to claim 2, wherein selecting one binary sequence from each of the U binary sequence pairs comprises:

establishing one-to-one correspondence between the last N binary sequence pairs of the U binary sequence pairs and the N bits of the target sequence;

for each of the last N binary sequence pairs of the U binary sequence pairs, when the value of the corresponding bit of the target sequence is '0', selecting the binary sequence from the first candidate sequence set as a binary sequence in the to-be-delayed sequence set; and when the value of the corresponding bit of the target sequence is '1', selecting the binary sequence from the second candidate sequence set as a binary sequence in the to-be-delayed sequence set; and for each of the first U-N binary sequence pairs of the U binary sequence pairs, selecting the binary sequence from the first candidate sequence set as a binary sequence in the to-be-delayed sequence set.

4. The method for target sequence identification according to claim 1, wherein configuring various delay durations for each binary sequence of the to-be-delayed sequence set in a descending manner comprises: configuring a delay duration of miT for the ith binary sequence of the U binary sequences in the to-be-delayed sequence set in a descending manner; wherein, T is a bit period of the optical sequence; mi is a decreasing coefficient corresponding to the ith binary sequence and mi=[U−1, U−2, . . . 0].

5. The method for target sequence identification according to claim 4, wherein delaying each binary sequence of the to-be-delayed sequence set according to its delay duration configured comprises: for the ith binary sequence of the U binary sequences in the to-be-delayed sequence, adding mi zeros in front of the binary sequence, wherein, mi is the decreasing coefficient corresponding to the ith binary sequence.

6. The method for target sequence identification according to claim 1, wherein performing an AND operation on the binary sequences in the to-be-matched sequence set comprises:
 matching each of the first U-L binary sequences in the to-be-matched sequence set with an all-one sequence to generate U-L sequence pairs to be matched; wherein L is the minimum length of the target sequence preconfigured;
 selecting a binary sequence from each of the U-L sequence pairs according to the length of the target sequence as U-L binary sequences in an input sequence set;
 performing an AND operation on the U-L binary sequences of the input sequence set and the remaining L binary sequences in the to-be-matched sequence set to generate the final sequence.

7. The method for target sequence identification according to claim 6, wherein selecting a binary sequence from each of the U-L sequence pairs comprises:
 when the length N of the target sequence equals to L, selecting the all-one sequence for each of the U-L sequence pairs;
 when the length N of the target sequence equals to U, selecting the binary sequence from the to-be-matched sequence set for each of the U-L sequence pairs; and
 when the length N of the target sequence is smaller than U but larger than L, for each of the first U-N sequence pairs, selecting the all-one sequence, and for each of the other N-L sequence pairs, selecting the binary sequences from the to-be-matched sequence set.

8. The method for target sequence identification according to claim 6, wherein performing an AND operation on the U-L binary sequences of the input sequence set and the remaining L binary sequences in the to-be-matched sequence set comprises: performing a serial AND operation on the U-L binary sequences of the input sequence set and the remaining L binary sequences in the to-be-matched sequence set.

9. The method for target sequence identification according to claim 6, wherein performing an AND operation on the U-L binary sequences of the input sequence set and the remaining L binary sequences in the to-be-matched sequence set comprises: performing a parallel AND operation on the U-L binary sequences of the input sequence set and the remaining L binary sequences in the to-be-matched sequence set.

10. The method for target sequence identification according to claim 1, wherein determining the number and position of the target sequence in the optical binary sequence according to the number and position of a pulse in the final sequence comprises:
 determining that a target sequence is contained in the optical binary sequence when the final sequence contains a pulse;
 determining the number of target sequences contained in the optical binary sequence according to the number of pulses in the final sequence; and
 determining the position of the last bit of each target sequence contained in the optical binary sequence according to the position of each pulse in the final sequence.

11. The method for target sequence identification according to claim 1, further comprising: performing an optical power amplification on the optical binary sequence or the result sequence of the XNOR operation before splitting.

12. A device for target sequence identification, comprising:
 a first candidate sequence set generation module, to perform an exclusive NOR (XNOR operation on an optical binary sequence and an all-zero sequence, generate a first candidate sequence set by splitting the result sequence of the XNOR operation into multiple binary sequences; wherein, the number U of binary sequences in the first candidate sequence set is not less than the length N of the target sequence;
 a second candidate sequence set generation module, to generate a second candidate sequence set by splitting the optical binary sequence into multiple binary sequences; wherein, the number of binary sequences in the second candidate sequence set is the same as the number of binary sequences in the first candidate sequence set;
 a preprocessing module, to select P binary sequences from the first candidate sequence set and the second candidate sequence set according to the target sequence to generate a to-be-delayed sequence set;
 a delay module, to configure various delay durations for each binary sequence of the to-be-delayed sequence set in a descending manner, generate a to-be-matched sequence set by delaying each binary sequence of the to-be-delayed sequence set according to its delay duration configured;
 an AND logic module, to perform an AND operation on the binary sequences in the to-be-matched sequence set to generate a final sequence; and
 an identification module, to determine the number and position of the target sequence in the optical binary sequence according to the number and position of a pulse in the final sequence.

13. The device for target sequence identification according to claim 12, wherein the first candidate sequence set generation module comprises: an all-zero sequence generator, an XNOR gate and a first splitting assembly; wherein,
 all-zero sequence generator generates an all-zero sequence in the optical domain;
 the XNOR gate performs an XNOR operation on the optical binary sequence and the all-zero sequence input, and outputs an initial sequence; and
 the first splitting assembly comprises at least one light splitter, and the first splitting assembly splits the initial sequence input to generate the first candidate sequence set.

14. The device for target sequence identification according to claim 13, wherein the first candidate sequence set generation module further comprises: an optical amplifier connected between the XNOR gate and the first splitting assembly, to perform an optical power amplification on the initial sequence output by the XNOR gate, and outputs the initial sequence being amplified to the first splitting assembly.

15. The device for target sequence identification according to claim 12, wherein the second candidate sequence generation module comprises:
    a second splitting assembly; wherein, the second splitting assembly comprises at least one light splitter, and the second splitting assembly splits the optical binary sequence input to generate the second candidate sequence set; and
    an optical amplifier connected to the input of the second splitting assembly, to perform optical power amplification on the optical binary sequence, and output the optical binary sequence being amplified to the second splitting assembly.

16. The device for target sequence identification according to claim 12, wherein the preprocessing module comprises: a first optical switch array and a first controller; wherein,
    the first optical switch array comprises P two-to-one optical switches, wherein each of the P two-to-one optical switches selects a binary sequence from a binary sequence of the first candidate sequence set and a binary sequence of the second candidate sequence set input, and output the binary sequence selected as one binary sequence in the to-be-delayed sequence set; and
    the first controller controls the gating states of the P two-to-one optical switches in the first optical switch array according to the target sequence.

17. The device for target sequence identification according to claim 12, wherein the delay module comprises: a configuration unit and a delay circuit; wherein,
    the configuration unit configures a delay duration of miT for the ith binary sequence of P binary sequences in the to-be-delayed sequence set in a descending manner; wherein T is a bit period of the optical sequence; mi is a decreasing coefficient corresponding to the ith binary sequence and mi=[U−1, U−2, . . . 0]; and
    for the ith binary sequence of the U binary sequences in the to-be-delayed sequence, the delay circuit adds mi zeros in front of the binary sequence.

18. The device for target sequence identification according to claim 12, wherein the AND logic module comprises: an all-one sequence set generator, a second optical switch array, a second controller and an AND gate array; wherein,
    the all-one sequence set generator generates P-L all-one sequences in the optical domain;
    the second optical switch array comprises P-L two-to-one optical switches, wherein L is the minimum length of the target sequence preconfigured; each of the P-L two-to-one optical switches selects a binary sequence from a binary sequence of the to-be-matched sequence set and an all-one sequence, wherein the binary sequence selected is served as an input of the AND gate array;
    the second controller controls the gating states of the P-L two-to-one optical switches in the second optical switch array according to the length of the target sequence; and
    the AND gate array performs an AND operation on the P-L binary sequences output by the second optical switch array and the last L binary sequences in the to-be-matched sequence set to generate the final sequence.

19. The device for target sequence identification according to claim 18, wherein the AND gate array refers to the first AND gate array, which comprises P−1 AND gates connected in a serial manner; wherein,
    the output of the first AND gate of the P−1 AND gates is connected to one input of the second AND gate;
    the output of the ith AND gate is connected to one input the (i+1)th AND gate; wherein, i is an integer between 1 and P−2; wherein
    the output of the P−1 AND gate serves as the output of the first AND gate array; and the two inputs of the first AND gate and the other inputs of the second to P−1 logic gate serve as the P inputs of the first AND gate array.

20. The device for target sequence identification according to claim 18, wherein the AND gate array refers to the second AND gate array, which comprises P−1 AND gates connected in a parallel manner; wherein,
    the P−1 AND gates are divided into K levels, wherein K=⌈ log 2P⌉ and ⌈ ⌉ represents an upward rounding operation;
    the outputs of the AND gates of the ith level serve as the inputs the AND gates of the (i+1)th level; wherein i is an integer between 1 and K−1; wherein
    the inputs of the AND gates of the first level serve as the inputs of the second AND gate array;
    and the output of the AND gate of the Kth level serves as the output of the second AND gate array.

* * * * *